Dec. 2, 1969 W. G. BASLER ET AL 3,481,728
FLOAT GLASS CHAMBER WITH SEPARATED TEMPERATURE
EQUALIZING ZONES
Filed Feb. 16, 1967 5 Sheets-Sheet 4

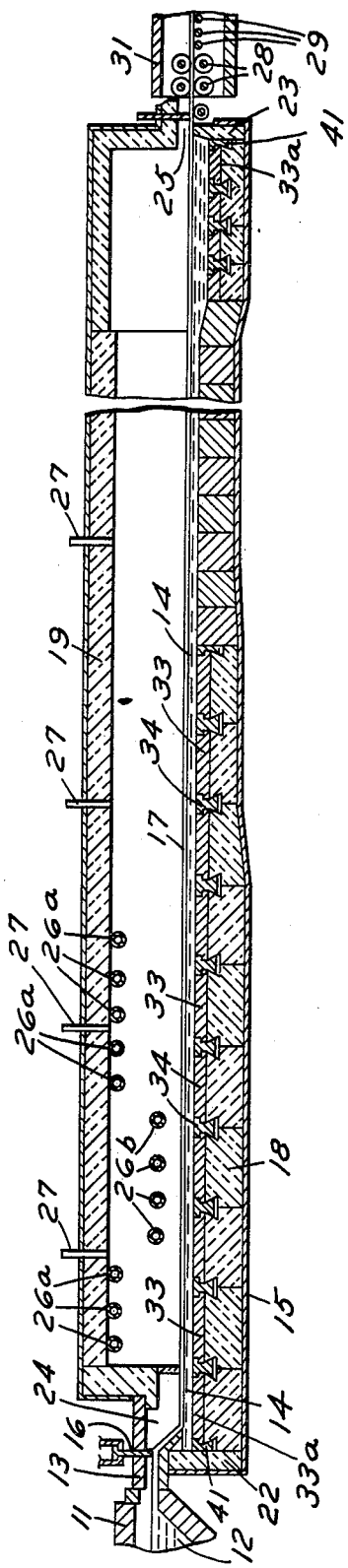

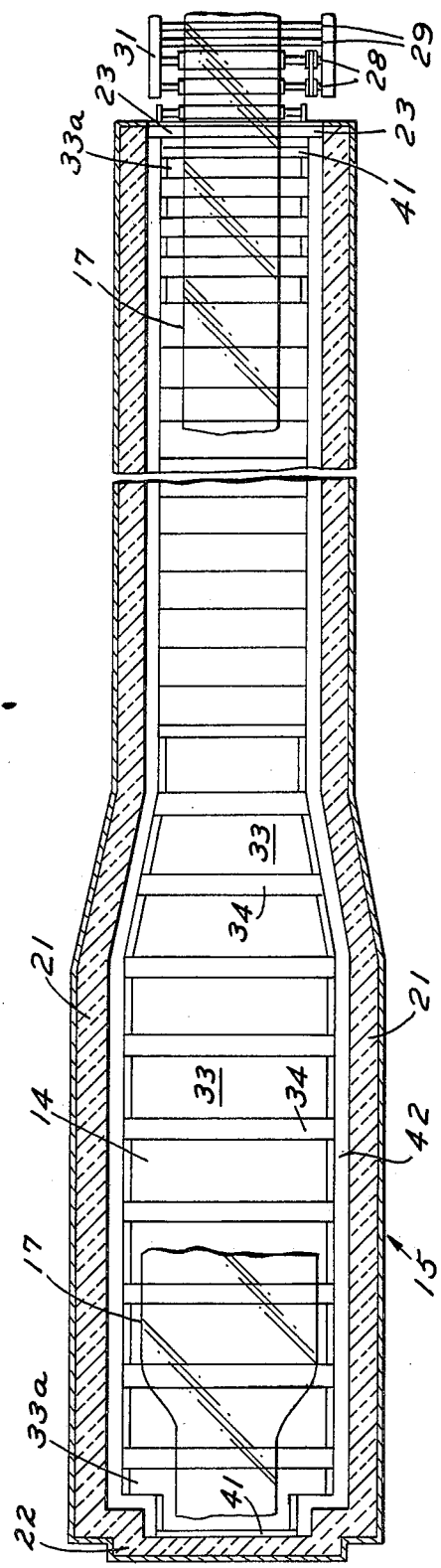

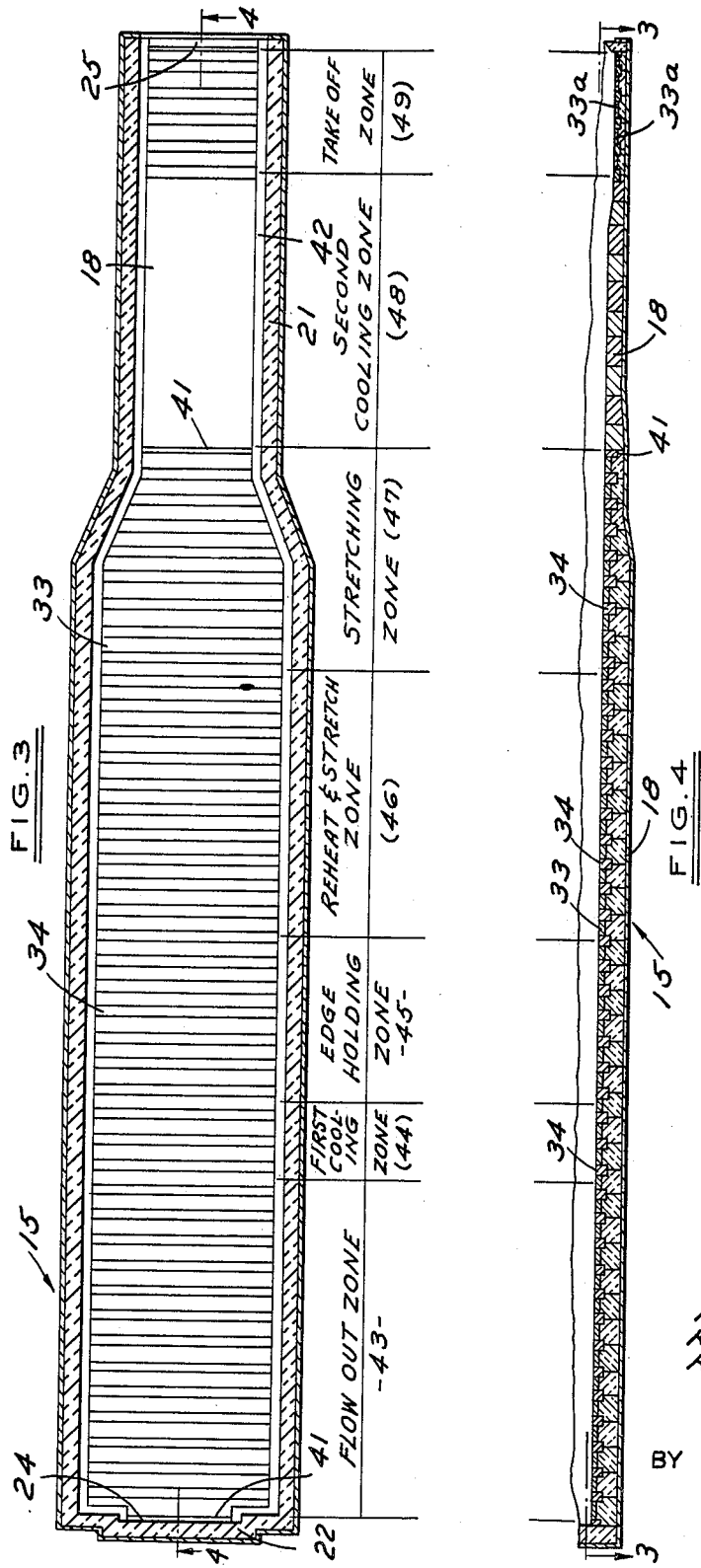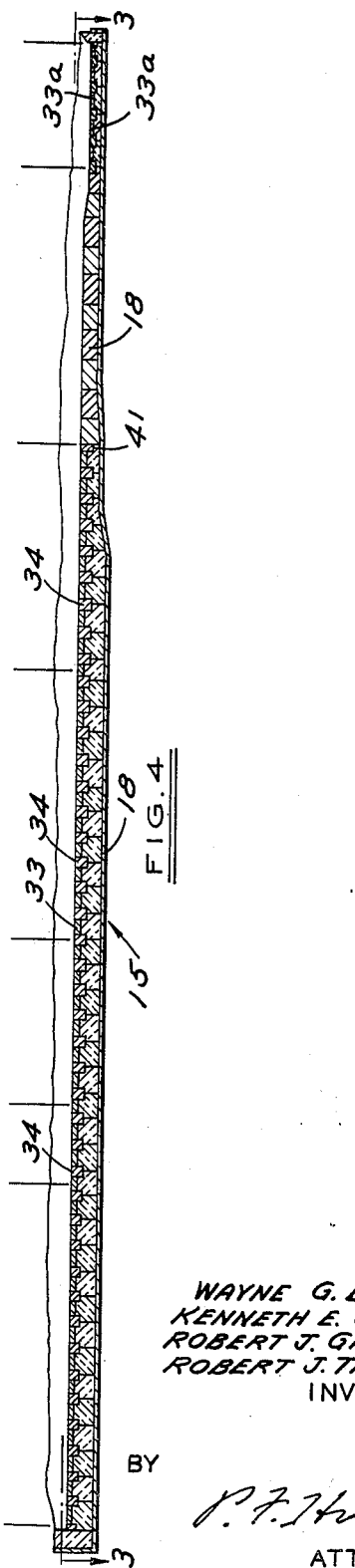

WAYNE G. BASLER
KENNETH E. COBURN
ROBERT J. GREENLER
ROBERT J. THOMPSON
INVENTORS

BY

P. F. Hilden
ATTORNEY

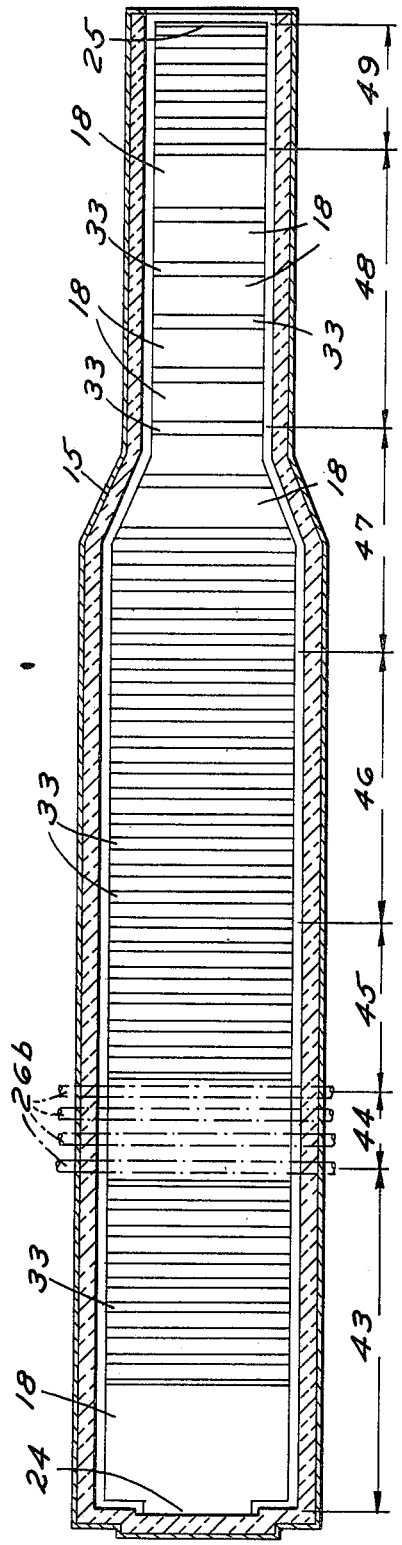

United States Patent Office 3,481,728
Patented Dec. 2, 1969

3,481,728
FLOAT GLASS CHAMBER WITH SEPARATED TEMPERATURE EQUALIZING ZONES
Wayne G. Basler, Lincoln Park, Kenneth E. Coburn, Franklin, and Robert J. Greenler and Robert J. Thompson, Monroe, Mich., assignors to Ford Motor Company, Dearborn, Mich., a corporation of Delaware
Filed Feb. 16, 1967, Ser. No. 616,625
Int. Cl. C03b 18/02
U.S. Cl. 65—182                                6 Claims

ABSTRACT OF THE DISCLOSURE

A tank for the manufacture of flat glass by a float process is constructed so as to have a temperature equalizing lining on the bottom of selected zones of the tank, the zones of the tank being defined along the length of a cavity formed by a refractory ceramic material. The liner may be formed from graphite. The separation of the lined zones by a bottom surface formed of the refractory material retards the conductive heat transfer between the lined zones.

---

This invention relates to the manufacture of flat glass by the so-called "float" process, wherein the glass is formed on the surface of a molten bath to obtain a glass ribbon having true parallelism of its opposite faces and a lustrous, fire-polished surface finish.

The "flat" process involves forming or floating a sheet or ribbon of glass on the surface of a molten bath of a metal or salt which has a greater density than that of glass, preferably a tin bath with or without small amounts of alloying elements. By more or less conventional means, molten glass is delivered at a uniform rate to one end of the bath to form a ribbon which is advanced along the surface of the bath under thermal conditions which permit the ribbon to harden sufficiently to be removed at the other end of the bath without harming the surface of the ribbon.

The bath is contained within an enclosed tank structure which comprises lower and upper refractory sections joined together except for a restricted entrance and exit passageway through which molten glass is fed to and the glass ribbon removed from the tank structure. The lower refractory section receives the pool of molten metal. The space above the metal bath contains a protective atmosphere preventing oxidation of the bath.

It is known to be advantageous to line the lower refractory section with slabs manufactured from a material which is nonwettable by the glass to prevent damage to the glass ribbon and which, also, possesses the characteristic of being a good thermal conductor. In copending U.S. patent application Ser. No. 409,664, now abandoned, filed Nov. 9, 1964, a graphite liner for the chamber receives the molten metal bath, usually molten tin, so as to be in contact with the molten tin and also the protective atmosphere provided in the chamber in order to react with any oxygen present to prevent oxidation of the tin and thus maintain the tin bath substantially free from oxides and reduce the tin content of the glass ribbon being formed on the bath.

Graphite, particularly at operating temperatures between 1200° F. and 1800° F., is a better conductor of heat than is molten tin. Moreover, the thickness of the graphite liner which preferably is of the order of 2½" plus the depth of tin, which may be of the order of 1½", forms a very good conductor of heat when compared with the same tin depth over the ceramic refractory lining customarily used in float tanks, which is a much poorer conductor. The superior conductivity of the graphite liner is quite advantageous in equalizing the temperature between the center zone and the lateral edges of the ribbon and is advantageous at the entrance end of the bath where the glass is flowed to equilibrium and also in further zones in which the glass is being either laterally or longitudinally attenuated in order to manufacture glass of less than equilibrium thickness.

The superior heat conducting characteristics of the graphite liner are disadvantageous in certain of the other zones due to the tendency of the liner to conduct heat longitudinally of the tank and prevent establishment of desired differentials of temperature along the length of the tank so as to permit relatively rapid cooling of the glass after the ribbon is established and flowed to equilibrium temperature, after attenuation has been completed, and to permit cooling sufficiently to take the ribbon from the bath without marring the ribbon by the take-off rolls.

The present invention is directed to placing a graphite liner in only certain areas of the bottom of the float tank. Other areas of the chamber are provided with a lining comprised of ceramic refractory material for retarding the longitudinal flow of heat though the tank lining.

Among the objects of the present invention are to provide an improved lining for the bottom of a float tank that will conduct heat laterally while retarding longitudinal flow of heat in certain areas of the tank; to provide such a lining which will facilitate establishing a temperature differential along the length of the molten metal bath in order to improve the quality of glass manufacture by the float process; and generally to improve apparatus and methods for the manufacture of said glass.

Other objects, and objects relating to details and economies of construction will be more apparent from the detailed description to follow.

Our invention is clearly defined in the appended claims. In the claims, as well as in the description, parts may at times be identified by specific names for clarity and convenience, but such nomenclature is to be understood as having the broadest invention as distinguished from the pertinent prior art. The best form in which we have contemplated applying our invention is illustrated in the accompanying drawings forming a part of this specification in which:

FIGURE 1 is a diagrammatic vertical longitudinal section of a float glass tank according to the present invention, a portion of the delivery end of the melting furnace and entrance end of the annealing lehr being shown.

FIGURE 1A is an enlarged fragmentary vertical section of the tank structure shown in FIG. 1.

FIGURE 2 is a diagrammatic horizontal section of the tank, portions of the glass ribbon and the entrance to the annealing lehr being shown.

FIGURE 3 is a diagrammatic horizontal section through the tank showing in more detail the selective positioning of the graphite and refractory slabs and indicating the various zones of the tank.

FIGURE 4 is a diagrammatic vertical section along the line 4—4 of FIG. 3.

FIGURE 7 is a diagrammatic horizontal section through the tank structure of a fourth form of the invention, the various zones of the tank being indicated.

Figure 5:
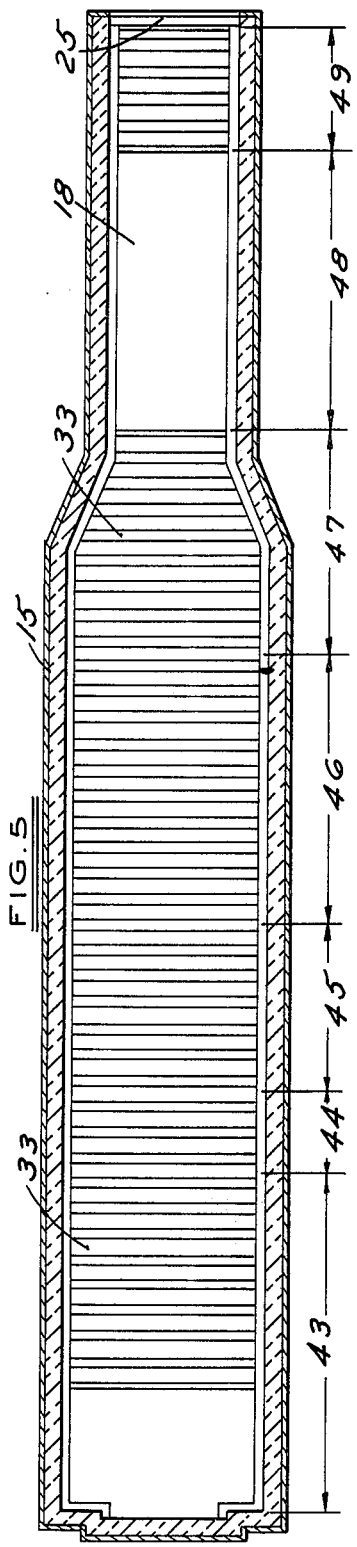
FIGURE 5 is a diagrammatic horizontal section through the tank structure of a second form of the invention, the various zones of the tank being indicated.

Referring now to the drawings, in FIG. 1 is seen the delivery end of a conventional glass melting furnace 11 in which a constant level of glass 12 is maintained. The molten glass 12 is delivered through a forehearth 13 onto the surface of a bath 14 of molten metal contained within a tank structure 15. A gate 16 controls the rate of glass 12 flowing from the furnace 11. The molten bath 14 has a density greater than that of the glass 12 so that the glass will float on the surface of the bath 14. By delivering molten glass at a constant rate and withdrawing the continuous sheet thus formed at a constant rate, a continuous glass ribbon of uniform width is produced. Preferably the bath 14 is a pool of molten tin, with or without minor amounts of alloying elements.

The tank structure 15 comprises a lower refractory section 18, an upper refractory section 19, sidewalls 21 and end walls 22 and 23 joined together except for a restricted entrance 24 and exit 25 to provide a substantially enclosed chamber. The sidewalls 21 and end walls 22 and 23 project above the top surface of the lower refractory 18 to define a container for the pool of molten tin 14.

To maintain the tin in molten condition and the glass ribbon 17 at the proper temperatures required to form a ribbon of good optical quality, thermal regulation means such as electrical heaters 26a and coolers 26b are installed in the roof of the tank structure 15. Heaters or electrodes (not shown) may also be immersed in the bath 14 if desired. Coolers 26b are provided to assure that the glass ribbon 17 will be sufficiently cooled and hardened to be removed through the exit 25 without damage to the ribbon. The heaters 26a are connected to a conventional power source (not shown) and may be individually controlled and used in conjunction with coolers 26b to obtain the desired rate of cooling of the ribbon 17.

Preferably, the glass 12 is introduced into the tank structure 15 at a temperature of about 1850° F. and the glass ribbon 17 is progressively cooled to a temperature of about 1100° F. at the exit 25.

A gas is introduced into the chamber through conduits 27 to provide a protective atmosphere. The gas should be inert or reducing to the components of the bath. Gases such as mixtures of nitrogen and hydrogen have been used for this purpose.

The solidified glass ribbon 17 is withdrawn by driven traction rolls 28 onto a conveyor 29 to enter an annealing lehr 31 where the ribbon 17 is further cooled under controlled conditions to remove or reduce residual stresses therein.

The lower refractory section 18 for most of the length of the tank is covered with slabs 33 preferably formed of graphite. The graphite slabs extend from side to side beneath the ribbon 17 and may extend beyond the lateral edges of the ribbon. At the operating temperatures of the bath, 1200° F. to 1800° F., graphite is a very good conductor of heat and tends to equalize the temperatures of the ribbon across its width as well as to form a non-wetting surface to which the ribbon will not adhere. At operating temperature throughout most of the bath, the graphite will react with any oxide present in the tin bath to reduce the oxide and prevent formation of bloom on the undersurface of the ribbon.

In FIGURES 1–4, each slab 33 is shown as held in position by transversely extending anchoring or hold-down means such as keys 34 which may also be made of graphite and which engage the two opposite transversely extending sides of each slab 33. The longitudinally extending sides of adjacent slabs abut. The joints between adjacent slabs are not sealed and the molten tin bath is permitted to flow under the slabs.

Each key 34, which extends across the width of the bath, has an upper T-shaped portion 35 and a lower tenon part 36. The lower refractory 18 has transversely extending keyways 37 in the form of mortises 38 interlockingly receiving the tenon parts 36 of the keys 34 to effect dovetail connections therebetween. The mortise 38 in the lower refractory 18 is slightly greater in depth than the length of the tenon part 36 so as to provide clearance between the key 34 and keyway 37. The transversely extending sides of each slab 33 have stepped portions 39 to engage the side of the T-shaped part 35 of the keys 34.

The slabs 33 of graphite will be raised slightly by the buoyancy exerted upon the slabs 33 by the molten tin until the stepped portions 39 engage the upper T-shaped parts 35 of the keys 34. The upper parts 35 of the keys 34 are retained well below the surface of the molten tin in the bath 14. A depth of the tin bath of at least one inch and deeper in certain areas if desired is maintained to reduce the likelihood of the glass ribbon 17 coming into contact with the slab 33 in case the ribbon buckles within the tank structure 15.

In FIG. 1, the hold-down means for the slabs 33a at the exit 25 of the tank structure 15 is shown in section. The end slabs 33a at either the entrance 24 or the exit 25 are held by longitudinally split or half keys 41 which are half the width of keys 34 and have a flat, vertical longitudinal side. The flat surface of the split key 41 abuts the end wall 22 while the remaining half of the T-shaped upper part 35 overlies the adjacent end slab 33a.

The sidewall 21 preferably projects above the top surface of the lower refractory 18 with the inward facing surface of the upper portion of the sidewall 21 being sloped. A side block 42 of a carbonaceous material, preferably graphite, is held against this sloped surface by conventional fastening means (not shown) to prevent the glass ribbon 17 from contacting the sidewall 21.

The tank structure 15 may be divided into several zones to identify the function performed on the ribbon in that zone or certain conditions imposed in the chamber to allow for the formation of a glass ribbon of a specified uniform thickness and of a desired quality. The exact location of the boundaries of these zones will vary with the requirements of the process. In FIGURE 3 there is shown the approximate location of zones that are used for the production of ⅛" thick float glass of windshield quality.

At the beginning of the tank structure 15, a flow-out zone 43 is provided. In the flow-out zone 43, the molten glass 12 flowing through the forehearth 13 is delivered to the surface of the bath 14 on which it spreads to form the ribbon 17. Adjacent the flow-out zone 43 is a first cooling zone 44 in which coolers 26b are disposed over the ribbon 17 to cool it. The next zone can be referred to as the edge-holding zone 45 in which edge rolls (not shown) are applied to the ribbon 17. After the rolls are applied, the ribbon 17 is reheated in the reheat and stretching zone 46 to change the viscosity of the glass to permit it to be stretched longitudinally by rolls 28. After reheat, an additional stretching zone 47 is provided to complete stretching of the glass ribbon to increased length and reduced thickness. The stretched ribbon 17 then is gradually cooled in the second cooling zone 48, and taken off the bath in the take-off zone 49 at the exit 25 of the tank structure 15 to be fed into the annealing lehr 31.

In FIGS. 1–4 is depicted one embodiment of this invention in which slabs 33 and keys 34 are positioned under the ribbon 17 in the flow-out zone 43, first cooling zone 44, edge-holding zone 45, reheat and stretching zone 46, stretching zone 47, and take-off zone 49 of the tank structure 15. When no graphite slabs are used, the refractory ceramic bottom lining 18 is brought up flush with the top surface of the slabs 33. The slabs 33 are omitted from the second cooling zone 48 to assure obtaining the drop in temperature required between the stretching zone 47 and the take-off zone 49 without unduly extending the length of the tank structure 15. Omission of the graphite slabs, as best seen in FIGURE 4, minimizes the heat transfer from the hotter zones to the exit 25 of the bath 14. In the take-off zone 49, slabs 33 are again provided and the depth of the molten tin may be increased to promote equalization of heat transversely of the ribbon 17 and thus facilitate annealing, the next operation in the process.

In FIG. 5 is seen a second embodiment of this invention in which slabs 33 also are omitted from the front portion of the flow-out zone 43. The molten glass 12 at the entrance end is approximately 1900° F. and very fluid. Under certain circumstances, it may be desirable to effect maximum lateral flow-out in the shortest longitudinal distance at the entrance end of the tank structure 15 to effectively decrease the time required for the formation of the glass ribbon 17. To achieve this result, it is desirable to minimize the transfer of heat from the entrance portion of the flow-out zone 43 to adjacent zones by omitting the graphite lining in this area.

Figure 6:
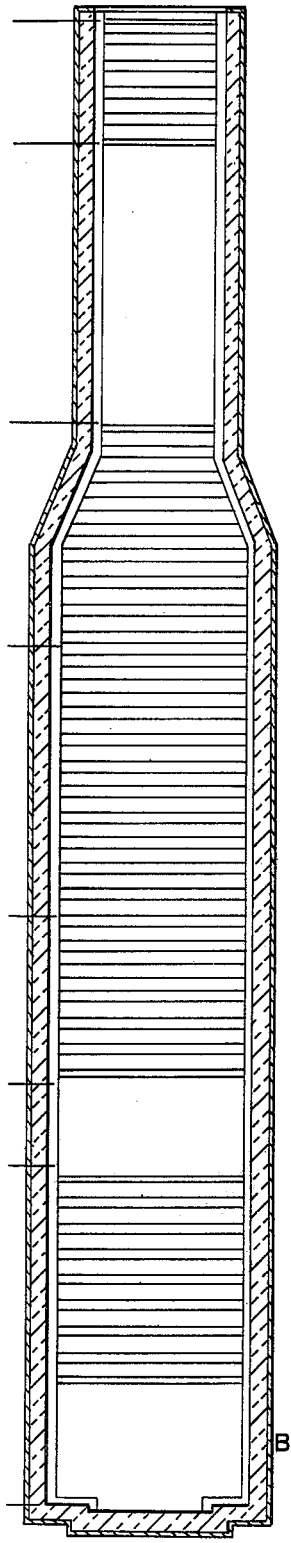
FIGURE 6 is a diagrammatic horizontal section through the tank structure of a third form of the invention, the various zones of the tank being indicated.

FIG. 6 depicts a third embodiment of this invention in which slabs 33 also have been omitted from the first cooling zone 44 in addition to the entrance portion of the flow-out zone 43 and the second cooling zone 48. Cooling of the glass ribbon 17 is an essential step to permit holding the edges of the ribbon 17 and stretching the ribbon 17, but as it is important to obtain a glass ribbon of high optical quality, the cooling of the ribbon at a relatively rapid rate should be confined to the cooling zones without unduly affecting adjacent zones. Omission of the slabs 33 from these zones will minimize heat loss from adjacent zones and reduce the cooling load on the coolers 26b installed in the cooling zones 44 and 48.

In FIG. 7 is shown a fourth embodiment in which transverse rows of graphite slabs 33 are alternated with ceramic refractory in the second cooling zone 48. This embodiment provides a heat transfer through the lining intermediate that obtained by means of several rows of graphite blocks 33 and several rows of the ceramic lining. By selectively positioning several rows of slabs 33 in the zone 48, the desired thermal conductivity may be obtained to achieve a glass ribbon possessing the specified quality requirements.

It is to be understood that the various embodiments or at least portions thereof can be combined in any manner to suit specific operating conditions or to effect special quality characteristics for a ribbon of glass of various thickness as manufactured by the float process.

What is claimed is:
1. In a tank which is divided into a plurality of longitudinally spaced functionally classified zones for the manufacture of flat glass by a float process, a plurality of refractory ceramic blocks forming a cavity, and molten metal received in said cavity to form a bath upon which molten glass may be poured and processed to form a glass ribbon, the improvement comprising:
  a plurality of liner blocks for equalizing the temperature distribution across a zone of the tank, said liner blocks being formed of a material having a thermal conductivity exceeding the thermal conductivity of said refractory blocks; and
  first mounting means for positioning a portion of said temperature equalizing liner blocks adjacent the top surface of a portion of said refractory blocks forming a first zone of said functionally classified zones of said tank; and
  second mounting means for positioning another portion of said temperature equalizing liner blocks adjacent the top surface of the portion of said refractory blocks forming a second functionally classified zone of said tank, said first and said second functionally classified zones of said tank being longitudinally separated by a third functionally classified zone of said tank in which the top surfaces of said refractory ceramic blocks in said third zone are free of said temperature equalizing liner blocks and substantially flush with the top surface of said liner blocks in at least one of said first or second zones.

2. The tank for the manufacture of flat glass as defined in claim 1 wherein said liner blocks are formed of graphite.

3. The tank for the manufacture of flat glass as defined in claim 2 wherein the length of the molten metal bath contained in the refractory cavity of the tank is divided so as to have at least the following functionally classified zones along the length of the tank: a flow out zone, a first cooling zone, an edge holding zone, a reheat and stretching zone, a second cooling zone, and a take-off zone; and wherein said two graphite lined zones separated only by said refractory zone are said stretching zone and said take-off zone.

4. The tank for the manufacture of flat glass as defined in claim 3 wherein said flow out zone also does not have a liner of graphite blocks therein.

5. The tank for the manufacture of flat glass as defined in claim 4 wherein said first cooling zone also does not have a liner of graphite blocks therein.

6. The tank for the manufacture of flat glass as defined in claim 3 wherein said second cooling zone does have portions thereof lined with graphite block but wherein said graphite blocks are not continuous throughout the full extent of the zone.

References Cited

UNITED STATES PATENTS 3,393,061               Greenler et al. _____ 65—99

S. LEON BASHORE, Primary Examiner

E. R. FREEDMAN, Assistant Examiner

U.S. Cl. X.R.

65—65, 99, 184, 374